(12) United States Patent
Webb

(10) Patent No.: US 6,307,854 B1
(45) Date of Patent: Oct. 23, 2001

(54) TELECOMMUNICATIONS SWITCH

(75) Inventor: Roderick Peter Webb, Woodbridge (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/091,650

(22) PCT Filed: Mar. 18, 1998

(86) PCT No.: PCT/GB98/00820

§ 371 Date: Jun. 22, 1998

§ 102(e) Date: Jun. 22, 1998

(87) PCT Pub. No.: WO98/42105

PCT Pub. Date: Sep. 24, 1998

(30) Foreign Application Priority Data

Mar. 19, 1997 (EP) .................................................. 97301842

(51) Int. Cl.⁷ .............................. H04L 12/56; G06E 3/00; G06F 15/80
(52) U.S. Cl. ........................... 370/360; 370/388; 370/389; 370/415; 340/2.24; 359/10; 359/15; 359/118; 706/40
(58) Field of Search ..................................... 370/357, 360, 370/386, 388, 389, 400, 412, 415, 428, 429; 359/1, 10, 11, 15, 115, 118, 135, 136; 706/15, 25, 40, 41, 42; 340/2.1, 2.2, 2.21, 2.22, 2.23, 2.24, 2.25, 2.26, 2.6

(56) References Cited

U.S. PATENT DOCUMENTS

| | | | | |
|---|---|---|---|---|
| 4,939,721 | * | 7/1990 | De Bosio .................................. | 370/60 |
| 5,130,976 | * | 7/1992 | Hickey et al. ........................... | 370/60 |
| 5,305,311 | * | 4/1994 | Lyles ....................................... | 370/60 |
| 5,327,420 | * | 7/1994 | Lyles ....................................... | 370/60 |
| 5,367,520 | * | 11/1994 | Cordell .................................... | 370/60 |
| 5,428,466 | * | 6/1995 | Rejman-Greene et al. ............ | 359/15 |

\* cited by examiner

Primary Examiner—Alpus H. Hsu
(74) Attorney, Agent, or Firm—Nixon & Vanderhye, P.C.

(57) ABSTRACT

A self-routing switch such as a Banyan switch has a controller which recognizes incoming routing requests which would give rise to blocking in the switch and makes and optimum selection of queued requests which can be handled without blocking. The controller is implemented by means of an optical neural network having a light source array to illuminate a photodetector array through a mask, there being a light source array element and a photodetector element for each possible path through the switch. The assignment of paths to array locations is such that, for the path corresponding to any light source array element, the photodetector array element positions corresponding to the paths blocked thereby form a pattern which is a shifted version of the pattern formed by the photodetector array elements corresponding to the paths blocked by a path corresponding to any other light source array element, whereby a single mask may be employed.

6 Claims, 13 Drawing Sheets

Neural network control of a switch

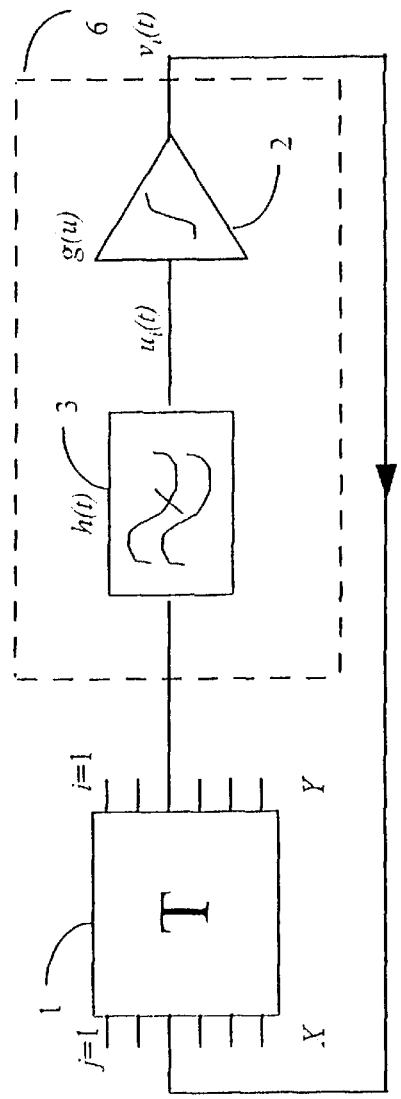
Figure 1 - General form of an electrical neural network
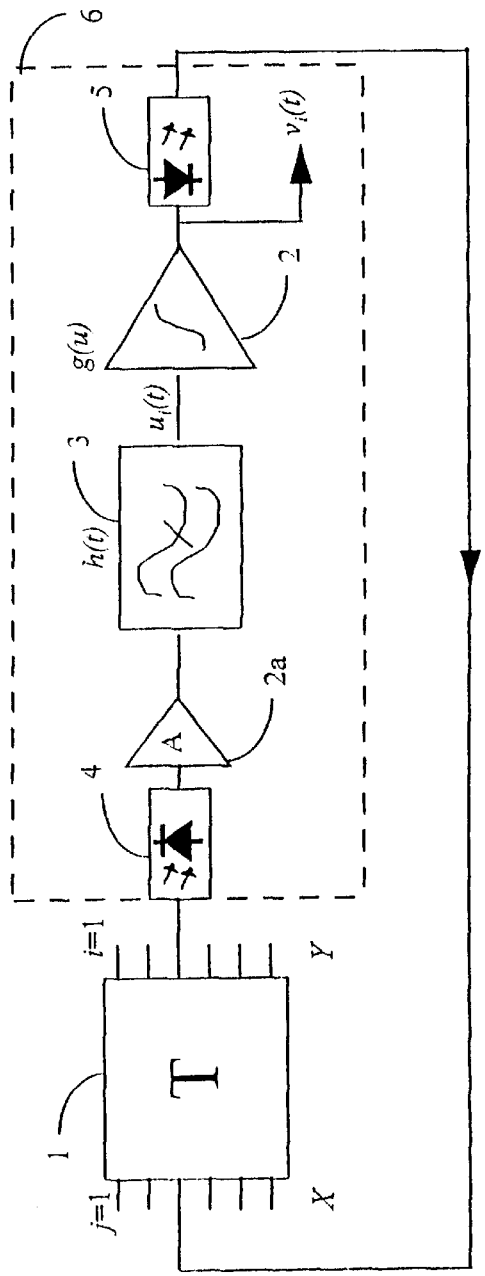
Figure 2 - General form of an optical neural network

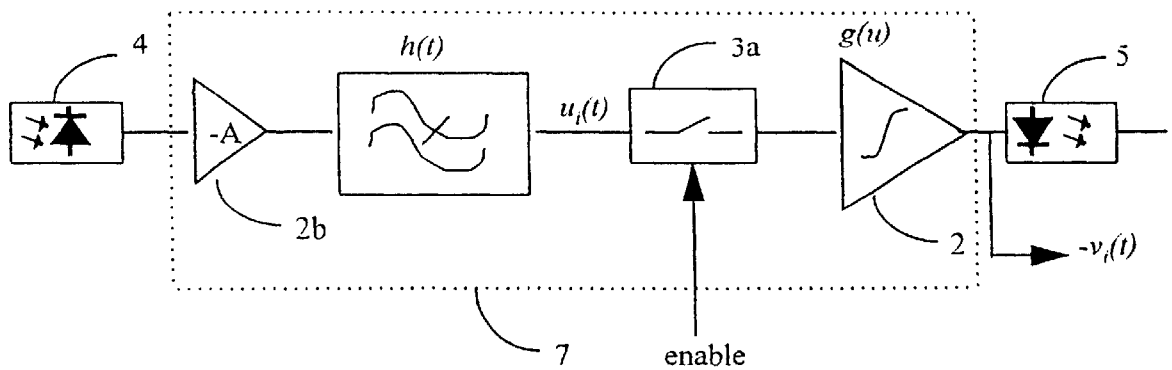
Figure 2a - Example of an optical neuron with an inhibitory output and an enabling input
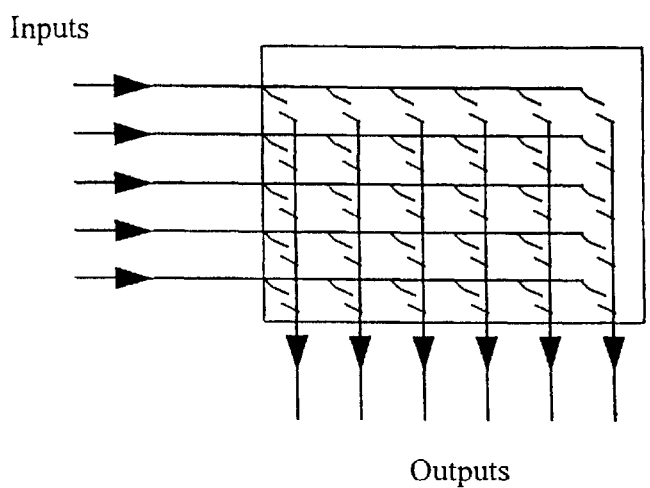
Figure 3 - Crossbar switch

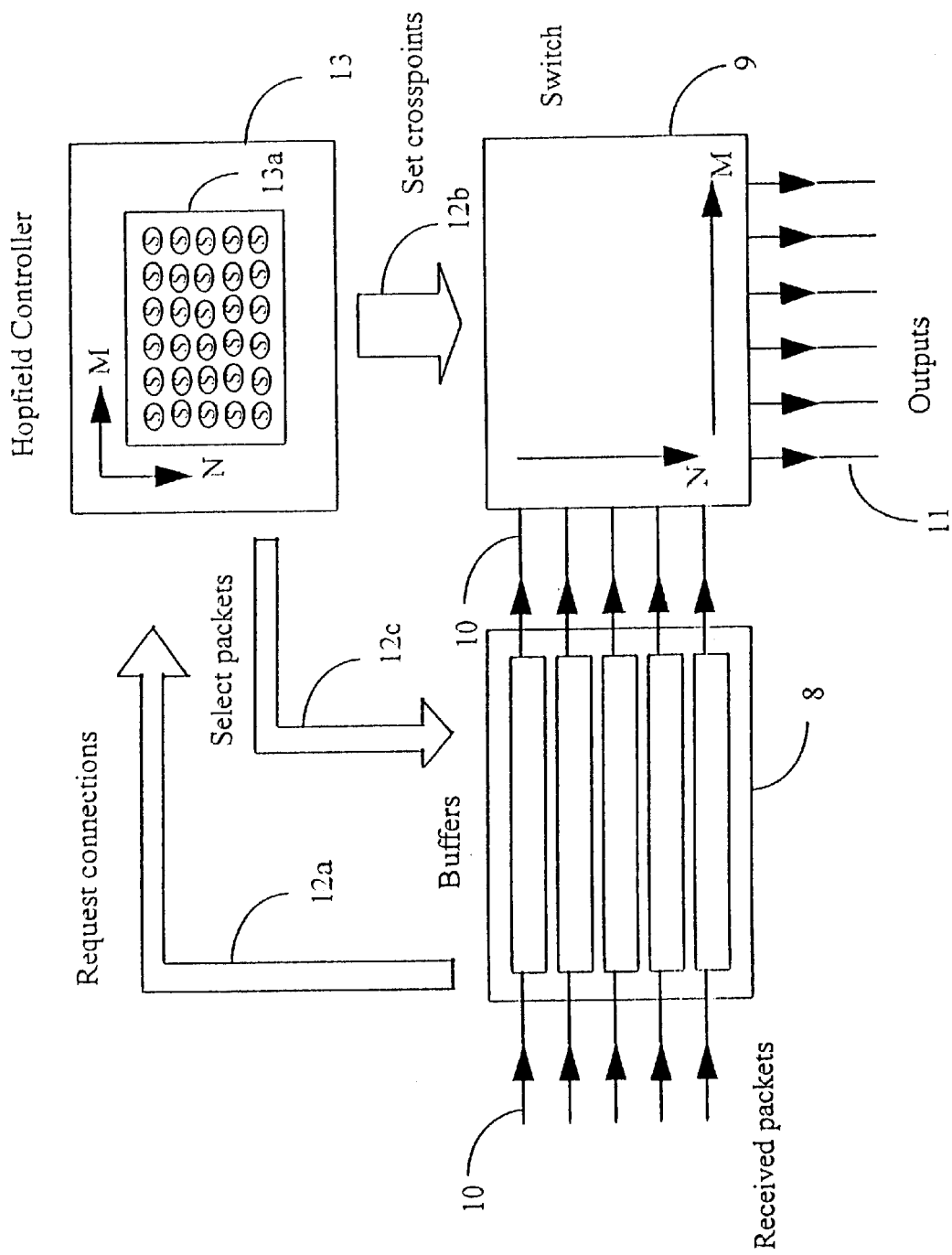
Figure 4 - Neural network control of a switch

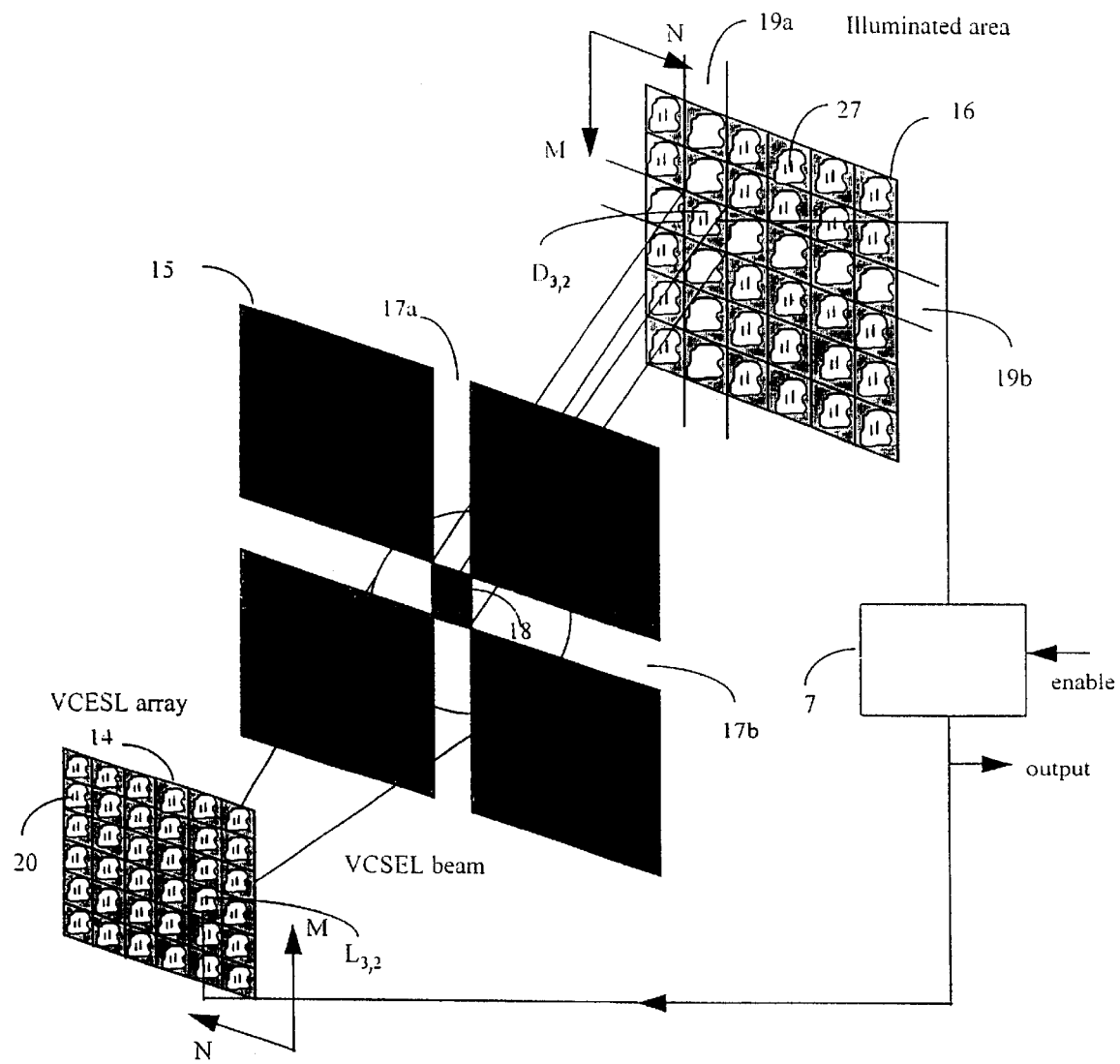
Figure 5 - An implementation of an optical neural network

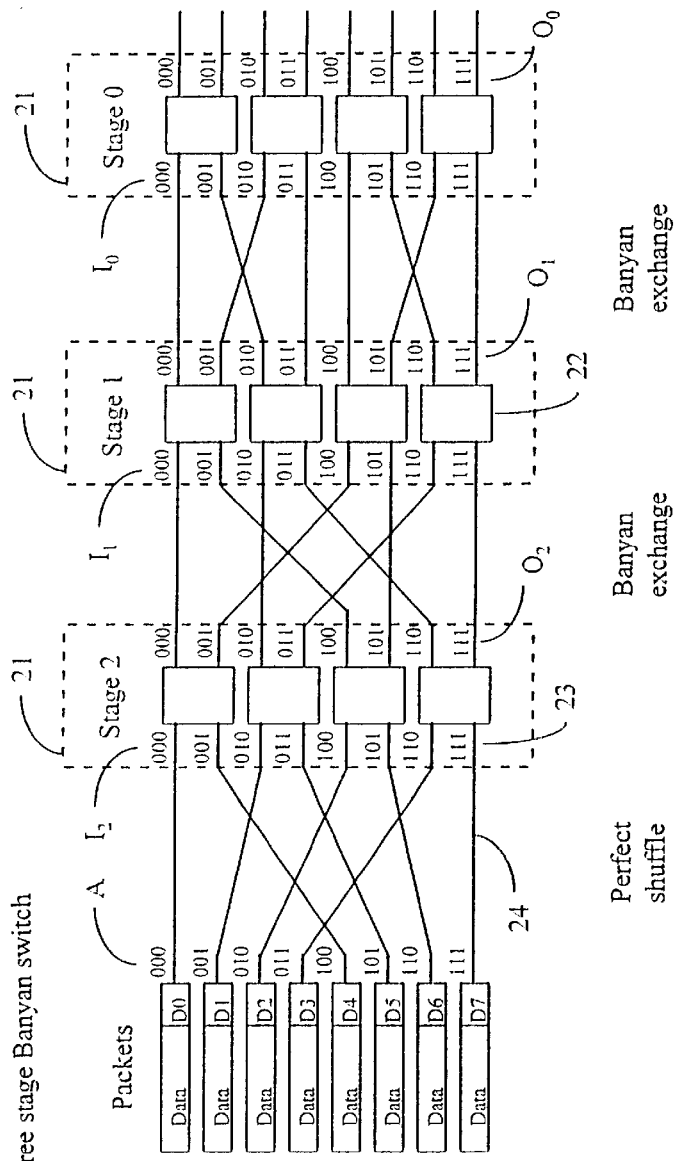
Figure 6 - Three stage Banyan switch
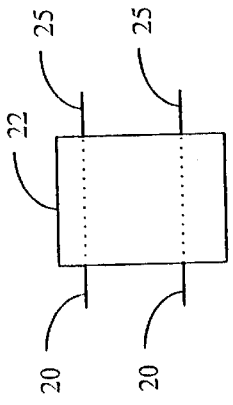
Figure 6a - Basic switching element
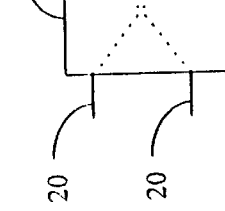
Figure 6b - Basic switching element Figure 7a
Blocking at each stage of a 3-stage Banyan switch for A = 4  D = 4

Figure 7b
Blocking at each stage of a 3-stage Banyan switch for A = 4  D = 4

Figure 7d
Blocking at each stage of a 3-stage Banyan switch for A = 4 D = 4

Figure 7c
Blocking at each stage of a 3-stage Banyan switch for A = 4 D = 4

Connections blocked for different A/D pairs

Connections blocked for different A/D pairs

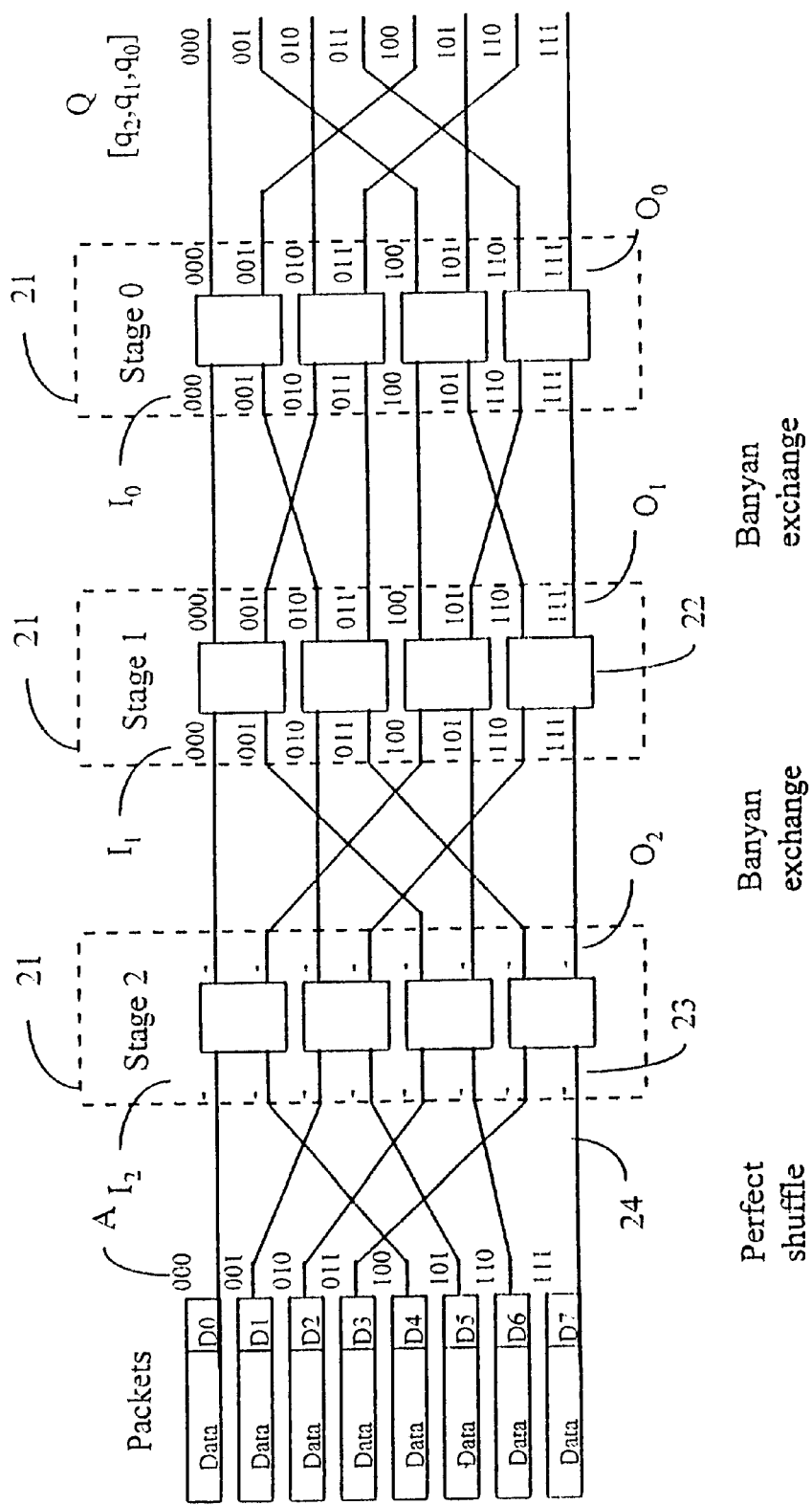
Figure 9 - Banyan switch with bit reversal

Connections blocked for source/destination line address pairs with destination line address reversed Connections blocked for source/destination line address pairs with destination line address reversed

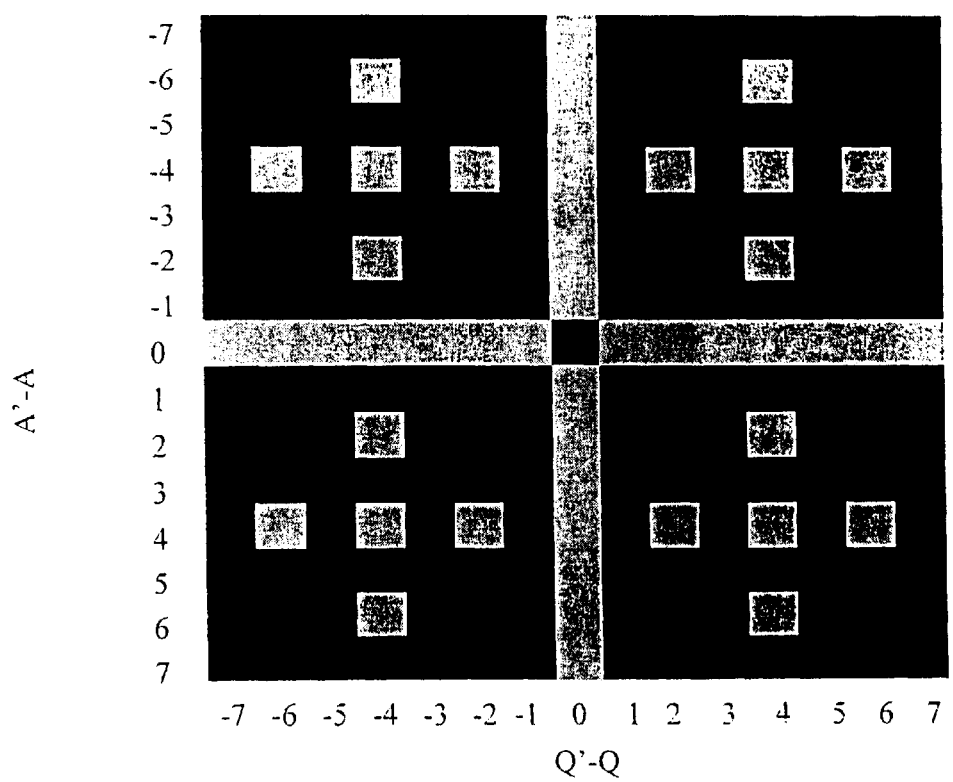
Figure 11 - Mask for 8x8 self-routing switch showing blocked connections when centered on an established connection Masks for 16x16 and
32x32 self-routing switches Masks for 16x16 and
32x32 self-routing switches

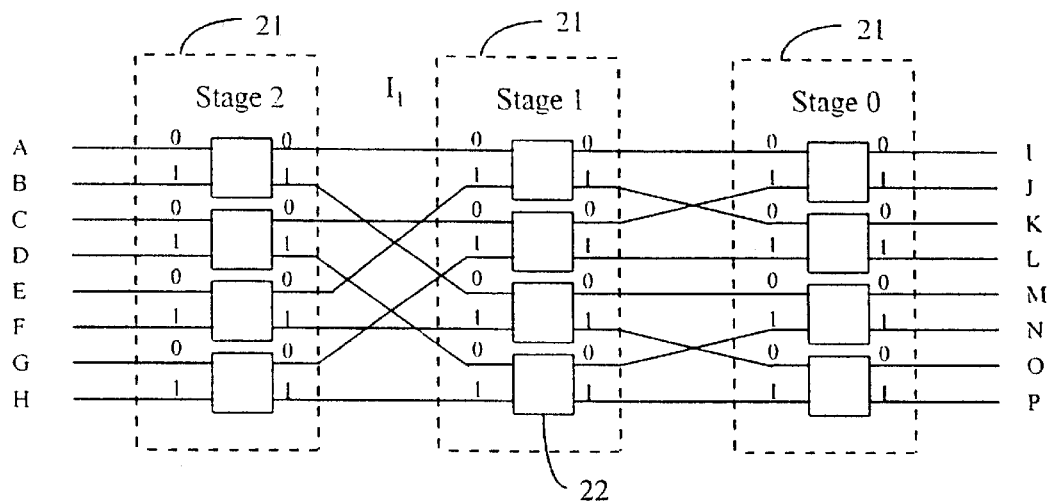
Figure 13 - Possible source/destination indices for a 3 stage Banyan switch
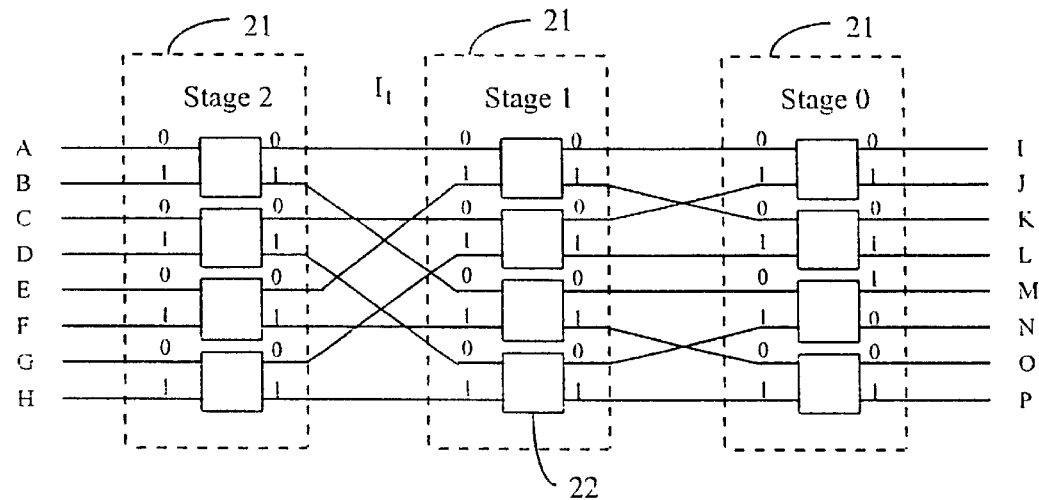
Figure 14 - Possible source/destination indices for a 3 stage Banyan switch
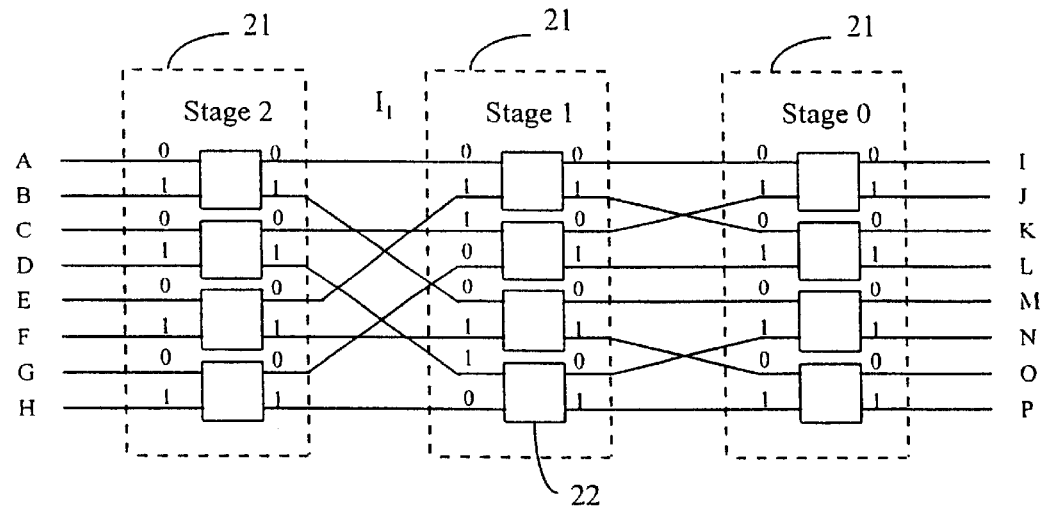
Figure 15 - Possible source/destination indices for a 3 stage Banyan switch

TELECOMMUNICATIONS SWITCH

RELATED APPLICATIONS

This application is related to the following: PCT/GB98/00820 filed on Mar. 18, 1998; and European Application 97301842.7 filed on Mar. 19, 1997.

BACKGROUND OF THE INVENTION

This invention relates to the use of optical neural networks to control switches, in particular to the control of self-routing switches.

A switch is a device which takes N inputs and reproduces some or all of them at M outputs in some desired permutation. A switch may comprise a number of smaller switching elements which are connected together to form a larger switching function. A self-routing switch is one in which the route through the switch is not determined by a global controller but rather local routing decisions are made at each smaller switch element and therefore routing can take place very quickly.

In a packet switching network, information to be transmitted is digitised and then formed into small packets, each of which contains a destination address. The packets are transmitted over a communications network. The packets may be transmitted in asynchronous transfer mode (ATM) which is a standardised packet switching protocol.

If a switch can permute the inputs in any order then the switch is known as non-blocking, otherwise it is known as blocking. Two or more of the routes through a self-routing switch may overlap causing internal blocking. Prevention of internal blocking may be achieved either by sorting the packets so they start at different inputs, or by bypassing blocked packets, transmitting non-blocked packets which arrive at the switch after the blocked packets.

Hence, although a global controller is not needed in a self-routing switch for routing the individual packets a controller is still required to resolve potential blocking unless packets are to be lost.

It has been proposed to apply the techniques of neural networks to controlling signals in an ATM network. A general review is given in T X Brown, 'Neural Networks for Switching' from E C Posner, Ed, 'Special Issue on Neural Networks in Communications', IEEE Communications Magazine, p72, November 1989; see also A Maren, C Hartson and R Rap, 'Handbook of Neural Computing Applications', Academic Press, London, 1990.

Artificial neural networks have been employed for many applications including pattern recognition and classification, content-addressable memory and combinatorial optimisation. For a general review, see J. Hertz, A. Krogh and R. G. Palmer, "Introduction to the theory of neural computation", Addison-Wesley, Redwood City, Calif., 1991.

Electrical neural networks have been employed for control of a crossbar switch, see our patent application WO-A-94/24637, and for the control of self routing switches, see "Neural Network design of a Banyan network controller", T. X. Brown & K. H. Lee, IEEJ on Selected Areas in Communications, Vol 8, No 8, pp 1428–1438,1990.

The individual neurons of a neural network may be connected together according to a number of different known schemes. They may be arranged in layers as in the case of a multi-layer perceptron, in which all the inputs to a given neuron are derived from the layer above. Another example is the Hopfield network, in which the neurons are mutually interconnected through neural weights. Many other connection schemes are well known in the art.

SUMMARY OF THE INVENTION

According to the invention there is provided a telecommunications switch comprising a switching device having a plurality of stages and control means for recognising routing requests which involve blocking of the switching device and including an optical neural network having a light source array to illuminate a photodetector array through a mask, each array having a respective array element for each possible path through the switching device, wherein the assignment of paths to array locations is such that, for the path corresponding to any light source array element, the photodetector array element positions corresponding to the paths blocked thereby form a pattern which is a shifted version of the pattern formed by the photodetector array elements corresponding to the paths blocked by a path corresponding to any other light source array element, whereby a single mask may be employed.

The switch may further comprise a plurality of buffers each with an input for receiving packets to be transmitted and an output line providing a source of packets to be switched.

The control means may be connected to receive destination addresses from packets stored in the buffer, to select packets which can be transmitted through the switching device without mutual blocking, and to release the selected packets from the buffers, Preferably a packet is routed from a source line, identified by a binary source address, to a destination line, identified by a binary destination address; each stage of the switching device has a stage index, the last stage has its outputs connected to destination lines of the switch and has a stage index of zero, preceding stages have their outputs connected to inputs of the subsequent stage, and have a stage index equal to the stage index of the subsequent stage incremented by unity;

an output used by a packet after each stage is dependent on a predetermined source set of bits taken from the binary source address and a predetermined destination set of bits taken from the binary destination address;

the number of bits in the source set is equal to the stage index; and the number of bits in the destination set is equal to the stage index subtracted from the total number of stages.

Preferably each of said stages has a plurality of switching elements, and each switching element has two inputs and two outputs and is operable in response to the binary destination address contained in a packet received by the element to route the packet to one or other output, the connection between the stages being such that each element of the first stage can serve any destination line, each element of any subsequent stage can serve a subset of the destination lines served by the stage which precedes it, each element in the last stage can serve any source line and each element of any preceding stage can serve a subset of the source lines served by the stage which follows it;

In a preferred embodiment of the invention (i) the output of each element of the first stage has a destination index having a value of 0 or 1 according to whether it serves a first or a second partition of the destination lines;

(ii) the output of each element of each stage after the first has a destination index having a value of 0 or 1 according to whether it serves a first or a second partition of the destination lines served by those elements of the preceding stage to which the element in question is connected;

(iii) the input of each element of the last stage has a source index having a value of 0 or 1 according to whether it serves a first or a second partition of the source lines;

(iv) the input of each element of each preceding stage has a source index having a value of 0 or 1 according to whether it serves a first or a second partition of the source lines served by those elements of the following stage to which the element in question is connected;

(v) for each of said possible paths, the position in the respective array of the light source and of the photodetector which corresponds to that path is determined:

in a first co-ordinate direction, by a first co-ordinate having a magnitude equal to that represented by a binary number consisting of the destination indices of the element outputs traversed by that path, taken in the same order as the stages, with the index corresponding to an output from the first bank being the least significant bit and the index corresponding to an output from the last bank being the most significant bit; and in a second co-ordinate direction, by a second co-ordinate having a magnitude equal to that represented by a binary number consisting of the source indices of the element inputs traversed by that path, taken in the same order as the stages with the index corresponding to an input to the first bank being the most significant bit and the index corresponding to an input to the last bank being the least significant bit.

According to another aspect of the invention there is provided a telecommunications switch comprising:

(a) a plurality of buffers each with an input for receiving packets to be transmitted and an output line providing a source of packets to be switched;

(b) a switching device having a plurality of stages each with a plurality of switching elements, wherein each switching element has two inputs and two outputs and is operable in response to a destination address contained in a packet received by the element to route the packet to one or other output, wherein the first stage has its inputs connected to the source lines, subsequent stages have their inputs connected to outputs of the elements of the preceding stage and the last stage has outputs connected to destination lines of the switch, the links being such that each element of the first stage can serve any destination line, each element of any subsequent stage can serve a subset of the destination lines served by the stage which precedes it, each element in the last stage can serve any source line and each element of any preceding stage can serve a subset of the source lines served by the stage which follows it;

(c) control means connected to receive destination addresses from packets stored in the buffer, to select packets which can be transmitted through the switching device without mutual blocking, and to release the selected packets from the buffers, the control means including an optical neural network having a two-dimensional array of light sources disposed to illuminate via a mask a two-dimensional array of photodetectors, and feedback means from the detectors to the sources, wherein each light source corresponds to a respective one of possible paths through the switching device and each photodetector corresponds to a respective one of said possible paths; wherein:

(i) the output of each element of the first stage has a destination index having a value of 0 or 1 according to whether it serves a first or a second partition of the destination lines;

(ii) the output of each element of each stage after the first has a destination index having a value of 0 or 1 according to whether it serves a first or a second partition of the destination lines served by those elements of the preceding stage to which the element in question is connected;

(iii) the input of each element of the last stage has a source index having a value of 0 or 1 according to whether it serves a first or a second partition of the source lines;

(iv) the input of each element of each preceding stage has a source index having a value of 0 or 1 according to whether it serves a first or a second partition of the source lines served by those elements of the following stage to which the element in question is connected;

(v) for each of said possible paths, the position in the respective array of the light source and of the photodetector which corresponds to that path is determined:

in a first co-ordinate direction, by a first co-ordinate having a magnitude equal to that represented by a binary number consisting of the destination indices of the element outputs traversed by that path, taken in the same order as the stages, with the index corresponding to an output from the first bank being the least significant bit and the index corresponding to an output from the last bank being the most significant bit; and in a second co-ordinate direction, by a second co-ordinate having a magnitude equal to that represented by a binary number consisting of the source indices of the element inputs traversed by that path, taken in the same order as the stages with the index corresponding to an input to the first bank being the most significant bit and the index corresponding to an input to the last bank being the least significant bit.

BRIEF DESCRIPTION OF THE DRAWINGS

Some embodiments of the present invention will now be described, by way of example, with reference to the accompanying drawings, in which:

FIG. 1 shows a general form of an electrical neural network;

FIG. 2 shows a general form of an optical neural network;

FIG. 2a shows an example of an optical neuron with an inhibitory output and an enabling input;

FIG. 3 shows a crossbar switch;

FIG. 4 shows schematically neural network control of a switch;

FIG. 5 shows schematically an implementation of an optical neural network;

FIG. 6 shows a three stage Banyan Network;

FIGS. 6a and 6b show basic switching elements;

FIGS. 7a–7d show how blocking can occur at each stage in a Banyan network;

FIG. 9 shows a Banyan exchange with bit reversal;

FIG. 11 shows an optical mask showing the pattern of blocked paths for a 3 stage self-routing switch;

FIGS. 13 to 15 show possible source and destination indices for each element at each stage for a three stage Banyan switch.

DETAILED DESCRIPTION OF THE INVENTION

Figure 8B:
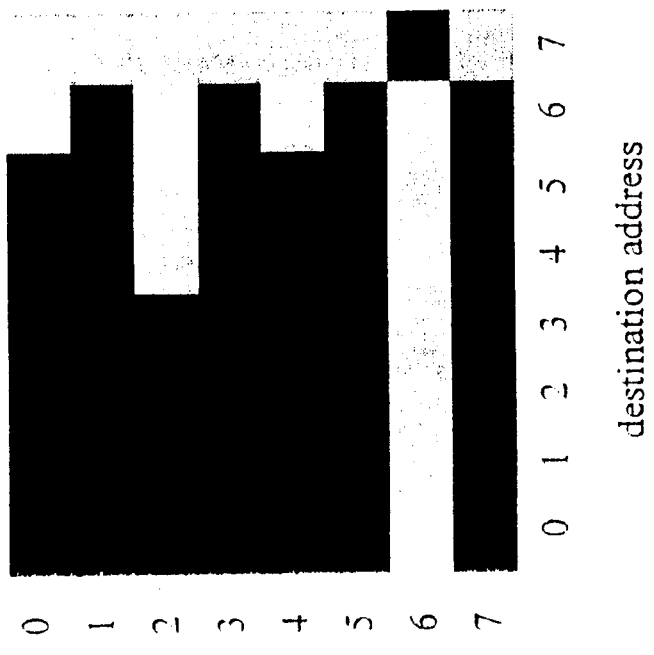
FIGS. 8a and 8b show paths blocked for various source and destination line addresses.

The operation of a Hopfield neural network to control a switch will now be described with reference to FIGS. 1 to 5.

FIG. 1 is a schematic block diagram of an electrical artificial neural network in which the connections to one of its constituent neurons is shown. The network consists of a weight matrix 1 which is a schematic illustration of the weighted interconnections between a plurality of neurons in the network. In FIG. 1, the weight matrix 1 is shown connected to the $i^{th}$ neuron of the network. The neuron consists of a low pass filter 3 with an impulse response h(t), which filters the weighted, combined signals from other neurons, derived from the weight matrix 1, so as to provide an filtered output signal $u_i(t)$. The filter 3 is connected to the amplifier 2 which has a non-linear transfer function g(u) which produces an output $v_i(t)$. The weight matrix 1 shown in FIG. 1 is general and does not imply any particular class of network, because the architecture is defined by the structure of the weight matrix. Thus, the drawing is sufficiently general to allow for the possibility of mutually interconnected neurons as in a Hopfield network, or for the separation of neurons into layers with all the connections directed to the layer above, as in a multi-layer perceptron, to give just two examples. The number of inputs to the weight matrix 1 may be different from the number of outputs, for example if there are external inputs to neurons in the neural network or outputs from neurons which are not connected to inputs of other neurons.

An optoelectronic example of such a network will now be described with reference to FIG. 2. In this example the matrix 1 is an optical matrix in which optical signals from a plurality of neurons are directed onto an optical receiver 4 associated with the $i^{th}$ neuron 6 so as to produce a weighted sum. The optical receiver may be an optical diode. The optical receiver 4 is followed by an electrical amplifier 2a. Thus the receiver produces an output that is proportional to the weighted sum of optical signals from the weight matrix 1. This signal is filtered by the low-pass filter 3 to produce a signal $u_i(t)$ which is applied to the amplifier 2 to produce an output signal $v_i(t)$. The filtered output signal is used to drive a laser 5 which produces an optical signal fed back into the optical weight matrix 1. Thus the operation is the similar to that described with reference to FIG. 1.

Another example of an optoelectronic neuron is shown in FIG. 2a where the signal from the optical receiver 4 is inverted by an inverting electrical amplifier 2b so that the optical signal produced by the optical receiver has the effect of inhibiting operation of the laser 5. The signal $u_i(t)$ is applied to an enabling circuit 3a which allows the laser 5 to receive the signal $u_i(t)$ if an enabling signal is present.

In FIG. 4a Hopfield network is shown controlling a switch. Digital signal packets are received on input lines 10 and buffers 8 where addresses associated with the signal packets are read to request a particular output connection line 11 through a switch 9. The system may operate with optical or electrical packets and in this example it is assumed that these signals are electrical. Data concerning the addresses read from the buffers 8 are fed through a bus 12a to a controller 13. If the switch is not self-routing the controller may control operation of the individual switches within the switch 9 through a bus 12b. Packets in the buffers 8 are released by the controller 13 through a bus 12c so as to pass through the switch 59. The controller 13 includes a neural network 13a that operates according to the Hopfield model and includes an M×N matrix of neurons. Each neuron $S_{mn}$ controls the transmission of a packet from input address n to output address m.

In this example, the neural network is an optical network, which is shown schematically in FIG. 5. The network includes an array 14 of vertical cavity surface emitting laser (VCSEL) devices 20 arranged on a common substrate (not shown), spaced apart from a mask 15 which is in turn spaced apart from an array 16 of optical detectors 27. The array of detectors 27 and the array of laser elements 20 have the same numbers M of rows and the same numbers N of columns. Each of the detectors is connected to a corresponding one of the laser elements through a respective inverting amplifier, low pass filter, enabling circuit and non linear amplifier. This is shown schematically in FIG. 5 for laser $L_{3,2}$ (that is, the laser in the second column of the third row) and a detector $D_{3,2}$ (that are interconnected by a circuit element 7, which contains the inverting amplifier 2b, the low pass filter 3, the enabling circuit 3a and the non linear amplifier 2 shown in FIG. 2a. It will be understood that M×N circuit elements 7 are provided to interconnect all the detectors 27 and the laser elements 20. Thus, for each neuron in FIG. 5, the detector 27 corresponds to the receiver 4 of FIG. 2, which is connected through an amplifier 2 and a filter 3 to a laser element 20, that corresponds to the laser 5 in FIG. 2. In FIG. 5, the M and N axial directions for the detector and laser arrays 14 are reversed relative those of the array 16. Thus the individual detectors 27 and lasers 20 are interconnected for diametrically opposed positions in the arrays. The mask 15 performs the weighting function of the weight matrix 1 in FIG. 2. In the example of FIG. 5, the arrays 14 and 16 include 6×6 elements.

The mask 15 consists of an opaque panel with transparent portions formed therein, in this example the transparent portions are cruciform strips 17a, 17b with an opaque rectangular panel 18 formed at the intersection of the cruciform strips 17a,17b.

In use, individual laser elements 20 of the laser array 15 are enabled according to connection requests from the packets held in buffers 8 (FIG. 3). Initially none of the laser elements 20 are enabled, thus none of the detectors are illuminated. An enabling signal received by the circuit element 7 will cause the corresponding laser element to turn on.

Referring to FIG. 5, an example is shown in which one of the laser elements $L_{3,2}$ is on. This produces illumination of the transparent cruciform region 17a,17b in the mask so that corresponding illuminated areas 19a,19b which extend horizontally and vertically respectively, are produced on the detector array 16. The central opaque panel 18 of the mask produces a dark shadow over the detector $D_{3,2}$. A detector in the illuminated areas 19a,19b produces an optical signal which is fed back via circuit element 7 which inhibits the operation of the corresponding laser to which the circuit element is connected.

A number of predetermined connection rules apply to a switch. In a crossbar switch, an example of which is shown in FIG. 3, these rules require that for any one particular input row of the crossbar switch, only one switch can be operated. Similarly, for any particular output column, only one switch can be operated. In FIG. 5, the mask 15 imposes these rules on the way in which the detector array is illuminated. Thus in the example of FIG. 5, the individual detector $D_{3,2}$ is not illuminated due to the effect of the central masked portion 18 whereas the remainder of the row with detectors $D_{m,2}$ (where $1 \leq m \leq M$) and the remainder of the column $D_{3,n}$ (where $1 \leq n \leq N$) is illuminated through the cruciform portion 17a, 17b of the mask. It will be understood in practice, a number of the lasers of array 14 will be simultaneously enabled in response to connection requests derived from signal packets received in buffers 8 (FIG. 3). The resulting illumination of the detector array 16 produces relatively low level illumination at some of the elements of array and relatively high illumination at others. Thus, the individual switching elements of the switch 9 are operated by Hopfield controller 13 (FIG. 4) in response to the signals arriving at the buffers 8, with the connections being optimised by the neural network 13 in order to maximise the number of valid connections made through the switch.

In order for the mask to operate as required, a key requirement of the predetermined connection rules for the switch are that they lead to a set of shift-invariant blocking rules regarding paths which would be blocked by a given connection request.

A set of blocking rules are shift-invariant if each path through the switch corresponds to the neuron in the position determined by a co-ordinate in a first co-ordinate direction corresponding to the destination line for the path and a co-ordinate in a second co-ordinate direction corresponding to the source line for the path such that for the path corresponding to any neuron, the neuron positions corresponding to the paths blocked thereby form a pattern which is a shifted version of the pattern formed by the neurons corresponding to the paths blocked by a path corresponding to any other neuron.

For the crossbar switch above, given any request to route a packet from input address n to output address m, packets requiring a route from input address n+i to output address m or from input address n to output address m+j will be blocked, where i and j are any integers. This means for any request to route a packet from input address n to output address m causing the corresponding laser element 20 denoted $L_{mn}$ to be illuminated, if the mask is aligned so that the opaque portion 18 prevents the laser element $L_{mn}$ from illuminating the corresponding detector 27 denoted $D_{mn}$ then the transparent portions 17a,17b cause illumination of the detectors $D_{m+j,n}$ and $D_{m,n+i}$ which correspond to blocked routes through the switch. The illumination cause inhibition of the operation of laser elements $L_{m+j,n}$ and $L_{m,n+i}$ via circuit element 7.

The operation of a Banyan switch will now be described with reference to FIGS. 6 to 8, and the blocking rules for such a switch will be determined. A number of 2×2 basic switching elements 22 (FIG. 6a) sometimes referred to as beta-elements are connected together to form a larger switch routing function. Each basic switching element has two input ports 20 and two output ports 25. A packet may be transmitted from either input port to either output port. Two packets may be transmitted simultaneously if neither the input or output ports are the same. The transmission of two packets simultaneously is illustrated in FIG. 6a by dotted lines.

A Banyan switch uses n stages of basic switching elements to route packets of data from $2^n$ data source lines to $2^n$ data destination lines. In the following description "n" is different form the "n" used in the above description of a Hopfield neural network. A Banyan switch for which n=3 is shown in FIG. 6. The switch comprises three stages 21 (labelled stage 2, stage 1 and stage 0). Each stage consists of 4 basic switching elements 22. Each stage is connected to the previous stage and the next stage by a number of links 24 except for the first stage and the last stage which are connected to the data source lines and data destination lines of the switch respectively.

In order to identify the path which each packet takes through the switch the input and output ports at each stage are labelled with an address. It should be understood that the addresses of the input and output ports at each stage are used for illustrative purposes as a convenient notation to identify the links between stages. Clearly, each link may be identified by the address of the output port from the previous stage (or in the case of the first stage by the address of the data source line) or by the address of the input port of the subsequent stage (or in the case of the last stage by the address of the data destination line).

The route a packet takes through a Banyan network may be described by a series of bitwise operations. There are two distinct types of operation, the first corresponding to the links between the stages (or between the first and last stage and the source and destination lines respectively) and the second corresponding to the connections within each basic switching element. In the first type of operation the links 24 connect an output port of a basic switching element to the input port of another (or in the case of the first and last stages, to the source and destination lines respectively) according to rules which depend on the input and output port addresses (or in the case of the first and last stages on the source and destination line addresses respectively), and also on which switching stages are to be connected together. In the second type of operation the route through each basic switching element depends on the input port address and the destination line address.

In order to describe the bitwise operations the following notation will be used. Each packet has a destination line address D having n bits $(d_{n-1},d_{n-2} \ldots d_1,d_0)$. At each stage, k, the input port has an address $I_k$ having n bits $(i_{n-1},i_{n-2} \ldots i_1,i_0)$, and the output port has an address $O_k$ having n bits $(o_{n-1},o_{n-2} \ldots o_1,o_0)$. Hence the following equation $$R_k(I_k)/D=O_k$$

is read as "the operation R at stage k on a packet arriving on the input port $I_k$, given the destination address D, will result in transmission of the packet through the output port $O_k$."

The principle of the Banyan self-routing switch is that at each stage, k, the packet with the destination address D having n bits $(d_{n-1},d_{n-2} \ldots d_1,d_0)$ is directed one port of an element 22 if $d_k=0$ or to the other port if $d_k=1$. After stage 0 the packet emerges from the port labelled with the address D, the required destination regardless of which input line it started from.

The routing operation R at stage k of each basic switch defined by the routing operator $R_k$ can be considered to be an operation on the input port address $I_k$ having n bits $(i_{n-1},i_{n-2} \ldots i_1,i_0)$ and the destination address D having n bits $(d_{n-1},d_{n-2} \ldots d_1,d_0)$ to give the output port address $O_k$ having n bits $(o_{n-1},o_{n-2} \ldots o_1,o_0 )$, $$R_k (i_{n-1},i_{n-2} \ldots i_1 i_0)/(d_{n-1},d_{n-2} \ldots d_1,d_0)=(i_{n-1},i_{n-2} \ldots i_1,d_k)$$

or $$O_k=(i_{n-1},i_{n-2} \ldots i_1,d_k)$$

The connection between the source line address A having n bits $(a_{n-1},a_{n-2} \ldots a_0)$ and the input ports of the first stage (stage n−1) of the Banyan switch consists of the perfect shuffle defined by the operator P $$I_{n-1}=P(a_{n-1},a_{n-2} \ldots a_0)=(a_{n-2},a_{n-3} \ldots a_0,a_{n-1})$$

The connection between any stage and the subsequent stage is a Banyan exchange, where the $k^{th}$ Banyan exchange connects the output port of each basic switch element with output port address $O_k=(o_{n-1},o_{n-2} \ldots o_0)$ to the input of the next stage which has the input port number with the kth address bit, $o_k$, exchanged with the least significant address bit, $o_0$:

$$I_{k-1}=B_k(o_{n-1},o_{n-2} \ldots o_{k+1},o_k,o_{k-1},o_{k-2} \ldots o_2,o_0)=(o_{n-1},o_{n-2} \ldots o_{k+1},o_0,o_{k-1},o_{k-2} \ldots o_2,o_k)$$

It is worth noting that the $O^{th}$ Banyan exchange whilst conceptually existing after the $O^{th}$ stage of the switch, actually has no effect. Thus $D=O_0$.

Hence, in order to route data from the source line address $A=(a_{n-1},a_{n-2} \ldots a_0)$ to the destination address $D=(d_{n-1},d_{n-2} \ldots d_0)$, the relevant operations are concatenated as follows:

$$R_0B_1R_1 \ldots B_{n-2}R_{n-2}B_{n-1}R_{n-1}P(A))D$$

So the data must pass through the following ports after each operation:

| Operation | Sequence of operations so far | Port address |
|---|---|---|
| Input | A | $=[a_{n-1}, a_{n-2} \ldots a_0]$ |
| Perfect Shuffle | $I_{n-1} = P(A)$ | $=[a_{n-2}, a_{n-3} \ldots a_0, a_{n-1}]$ |
| Switching Stage n−1 | $O_{n-1} = R_{n-1}(A)\backslash D$ | $=[a_{n-2}, a_{n-3} \ldots a_0, d_{n-1}]$ |
| Banyan exchange n−1 | $I_{n-2} = B_{n-1}R_{n-1}P(A)\backslash D$ | $=[d_{n-1}, a_{n-3} \ldots a_0, a_{n-2}]$ |
| Switching Stage n−2 | $O_{n-2} = R_{n-2}B_{n-1}R_{n-1}P(A)\backslash D$ | $=[d_{n-1}, a_{n-3} \ldots a_0, d_{n-2}]$ |
| Banyan exchange n−2 | $I_{n-3} = B_{n-2}R_{n-2}B_{n-1}R_{n-1}P(A)\backslash D$ | $=[d_{n-1}, d_{n-2} \ldots a_0, a_{n-3}]$ |
| ... | ... | ... |
| Banyan exchange 1 | $I_0 = B_1R_1 \ldots B_{n-2}B_{n-2}B_{n-1}R_{n-1}P(A)\backslash D$ | $=[d_{n-1}, d_{n-2} \ldots d_2, a_0]$ |
| Switching stage 0 | $O_0 = R_0B_1R_1 \ldots B_{n-2}R_{n-2}B_{n-1}R_{n-1}S(A)\backslash D$ | $=[d_{n-1}, d_{n-2} \ldots d_2, d_0]$ |

It can be seen that after each switching stage, k, the output port used at that stage is determined by the k least significant bits $[a_{k-1} \ldots a_0]$ of the input address and the n−k most significant bits $[d_{n-1} \ldots d_k]$ of the destination address. These bits also determine the input port used at the next stage. In determining whether blocking occurs we will consider the output port used at each stage although, of course, we could equally well consider the input port used at each stage, where the port numbers are as shown in FIG. 6. Hence, where bits $[a_{k-1} \ldots a_0]$ and $[d_{n-1} \ldots d_k]$ are the same for a given source/destination line address pair blocking will occur at stage k.

For example A=(0,0,0) D=(0,1,0) will block

A=(0,0,0) and D=(*,*,*) at stage 3
A=(*,0,0) and D=(0,*,*) at stage 2
A=(*,*,0) and D=(0,1,*) at stage 1
A=(*,*,*) and D=(0,1,0) at stage 0

Where * represents either 0 or 1.

The blocking can be represented schematically for each stage k by placing the output port address used at that stage, where the port numbers used are the decimal representation of those shown in FIG. 6, in matrices as shown in FIG. 7. The destination address D is shown along the top of the matrix, the source address A at the left and the input port address $I_k$ form the elements of the matrix. Thus, each matrix corresponds to a stage of the Banyan switch, with matrix n representing input blocking and matrix 0 representing output blocking. FIG. 7 shows schematically the input output pairs which would be blocked for A=3 and D=4 represented by circles 30 around the port numbers used, and for A=6 and D=7 represented by squares 31 around the port numbers used.

In order to create a mask which could be used in an optical neural network controller as describe above, an opaque mask with transparent portions which correspond to the blocked paths at each stage is used. The transparent portions which are required to represent blocked paths at each stage can be produced by superimposing the pattern of blocked paths for all the stages of the switch. FIG. 8 illustrates masks which represent blocked paths for A=3 and D=4, and for A=6 and D=7. The masks are created by superimposing the patterns shown in FIG. 7. However, there is an opaque portion representing the path which has been requested so that a given request does not inhibit itself.

Figure 8A:
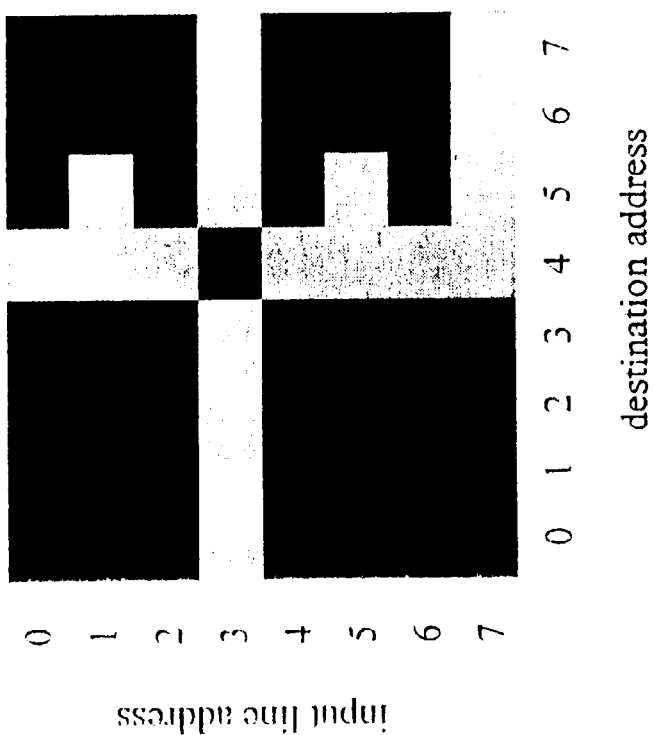

The mask of FIG. 8 show graphically that the blocking rules for determining which input output pairs are blocked by any given connection are not shift invariant in this example, therefore it is not possible to implement a controller for this configuration of network using an optical neural network as described above.

FIG. 9 shows a modified form of the Banyan exchange as envisaged for the present invention where the destination line addresses D are reordered create a bit reversed destination line address $Q=[q_{n-1}, \ldots q_0]$. in such a way that the binary representation of Q is the same as that of the destination line address, D, but in reverse order. That is $[q_{n-1}, \ldots q_0]=[d_0 \ldots d_{n-1}]$. Now, after each stage k the port number contains the k least significant bits of the source line address as before and the n−k least significant bits of the bit-reversed destination line address. That is bits $[a_{k-1} \ldots a_0]$ of the source line address and bits $[q_{n-k-1} \ldots q_0]$ of the bit-reversed destination line address. If these bits are the same as those of another packet then blocking will occur. The bit-reversed destination line address Q is then used in place of D to address the elements of the array in the blocking matrix.

This blocking condition can also be expressed by saying that at any stage k, the route from source address A' to bit-reversed destination line address Q' will be blocked by an existing connection from source address A to bit-reversed destination line address Q if $A'=A+u2^k$ and $Q'=Q+v2^{n-k}$, for any integer value of u and v. Either u or v may be 0, u=v=0 represents the blocking of another packet with the same source line address and the same destination line address. These blocking rules are shift invariant because an existing connection from the source address A shifted by a constant number c, A"=A+c to bit-reversed destination line address Q will block another connection A',Q' if $A'=A"+u2^k$ and $Q'=Q+v2^{n-k}$ and similarly if Q is shifted.

Figure 10A:
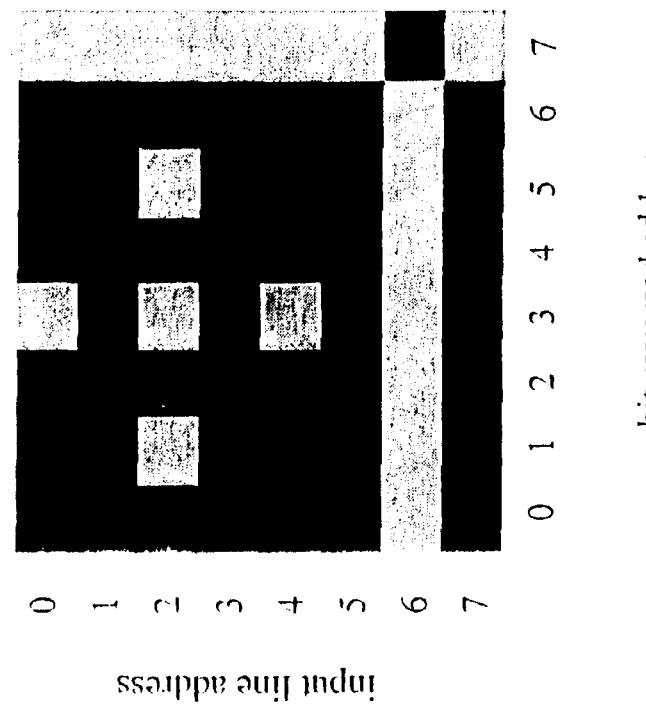
FIGS. 10a and 10b show paths blocked for various source and bit-reversed destination line addresses.
Figure 10B:
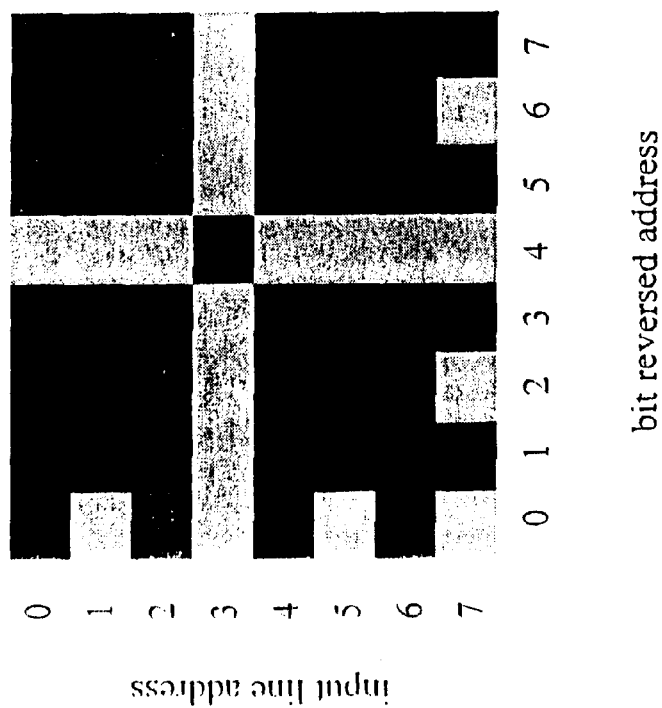

FIG. 10 shows the set of paths blocked for A=3 and Q=4, and for A=6 and Q=7.

Figures 12A, 12B:
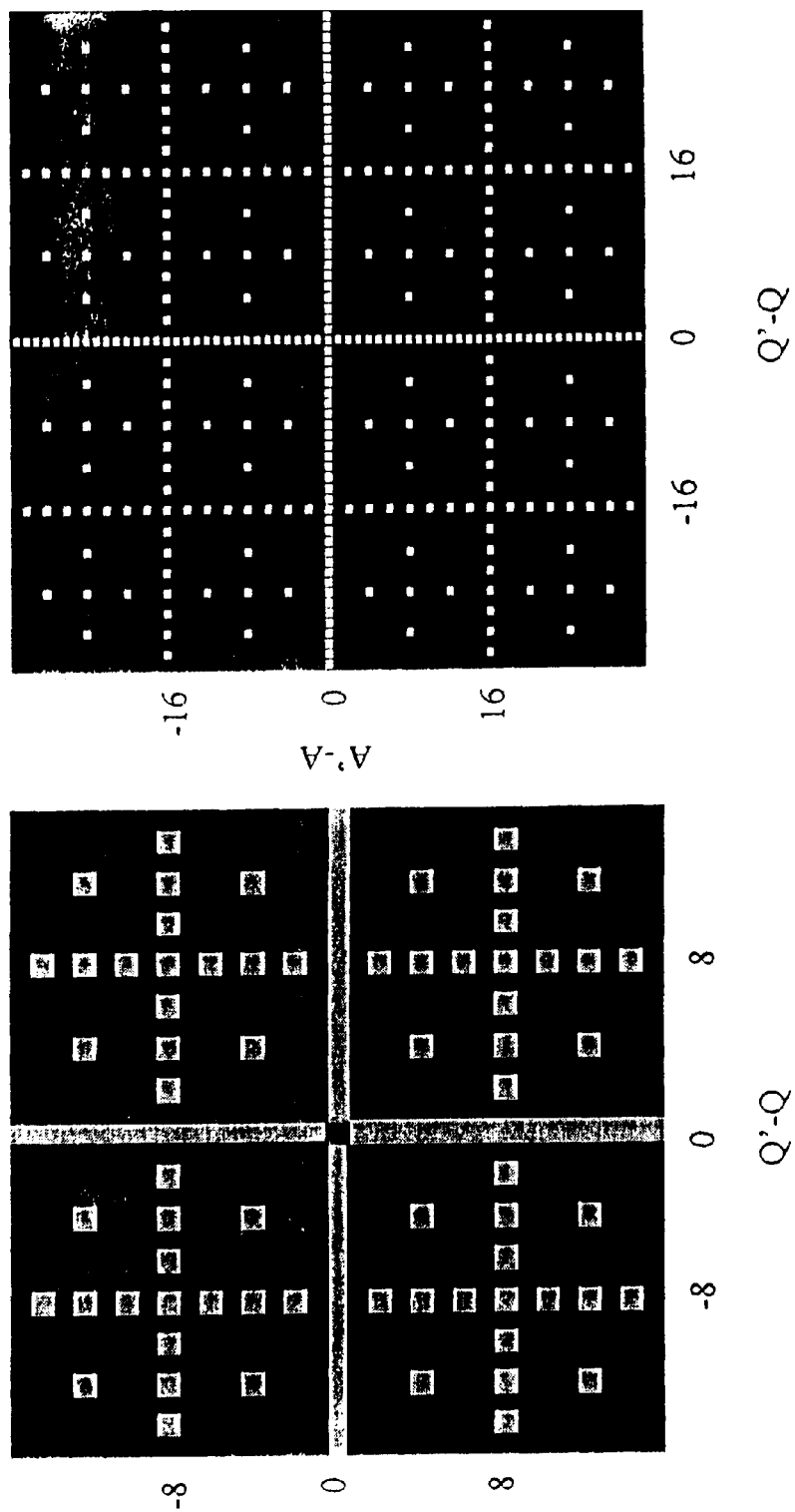
FIGS. 12a and 12b show optical masks showing the patterns of blocked paths for four and five stage self-routing switches.

By enlarging the pattern generated by the above equation to $(2^{n+1}-1)\times(2^{n+1}-1)$ the mask generated may be centered on any possible established connection and still overlap the remainder of the matrix. FIG. 11 shows the mask generated for and 8×8 Banyan network where n=3. The set of blocking rules are shift invariant so it is possible to use the optical neural network as described above to control a Banyan network using the mask shown in FIG. 11 if the correspondence between the destination lines and the elements of the blocking mask reordered as described. The principle extends to larger switches. FIG. 12 shows the mask for 16×16 and 32×32 switch controllers.

It is not necessary for the bit-reversal network to be included in the switch, it is sufficient for the destination lines to be represented in the appropriate order in the matrix of neurons for the blocking rules to be shift invariant. This principle also applies to the perfect shuffle applied to the source lines of the switch.

It is possible to control blocking in other configurations of self routing switch with an optical neural network controller as described above. In general, if a port used at a particular stage k, of a self routing switch may be determined by a particular set of k bits from the source line address and a particular set of n−k bits from the destination line address, where n is the number of bits in a binary representation of the addresses (the number of stages in the self routing network) then it is possible to create a correspondence between each destination line and a position in a first co-ordinate direction in a two dimensional array of neurons and a correspondence between each source line and a position a in a second co-ordinate direction in a two dimensional array of neurons such that the set of blocking rules are shift invariant. Therefore a single mask may be employed by an optical neural network controller as described above.

A switch is self-routing if it has the ability to route a packet from any of the input lines to any of the destination lines in response to bits in the destination line address. In general, in order for a switch comprising a plurality of stages consisting of a plurality of switching elements to have the ability to be self-routing, a connection condition applies as follows. The links between the stages must be such that each element of the first stage can serve any destination line, and each element of any subsequent stage can serve a subset of the destination lines served by the stage which precedes it. For the condition that a port used at a particular stage k, of the self routing switch may be determined by a particular set of k bits from the source line address and by a particular set of n−k bits from the destination line address (where n is the number of bits in a binary representation of the addresses, the number of stages in the self routing network) then the links between the stages must be such that if each switching element were reversed then the switch would have the ability to route a packet from any of the destination lines to any of the source lines in response to bits in the source line address. Hence a reciprocal connection condition to the above connection condition applies to the links between the stages. Thus, the links between stages must be such that each element in the last stage can serve any source line and each element of any preceding stage can serve a subset of the source lines served by the stage which follows it.

A Banyan switch is an example of a self routing switch where such connection conditions apply. Another example of a self routing switch where such connection conditions apply is an Omega switch where the links between each stage and the subsequent stage create a perfect shuffle (as defined above). Hence an Omega switch can be controlled by a similar optical neural network controller to that used to control a Banyan switch.

The output of each element of the first stage has a destination index having a value of 0 or 1 according to whether it serves a first or a second partition of the destination lines and the output of each element of each stage after the first has a destination index having a value of 0 or 1 according to whether it serves a first or a second partition of the destination lines served by those elements of the preceding stage to which the element in question is connected. At each stage the packet is routed to the output port with a destination index value according to a particular bit in the destination line address. There are many ways of choosing the destination indices. They may be identical to respective bits of the destination address as is the case in FIG. 9, but this is not essential as long as each element of the set of elements serving a given partition of the destination lines routes the packet to the output with the same destination index given a particular value of the relevant bit in the destination line address.

To determine a correspondence between source lines and a position in a first co-ordinate direction in a two dimensional array of neurons and a correspondence between the destination lines and a position in a second co-ordinate direction in the two dimensional array of neurons such that the blocking rules are shift-invariant the input ports of the switches are labelled with source indices in a similar manner to the labelling of the outputs with the destination indices above. Hence, the input of each element of the last stage has a source index having a value of 0 or 1 according to whether it serves a first or a second partition of the source lines and the input of each element of each preceding stage has a source index having a value of 0 or 1 according to whether it serves a first or a second partition of the source lines served by those elements of the following stage to which the element in question is connected.

The correspondence is determined as follows:

in a first co-ordinate direction, by a first co-ordinate having a magnitude equal to that represented by a binary number consisting of the destination indices of the element outputs traversed by that path, taken in the same order as the stages, with the index corresponding to an output from the first bank being the least significant bit and the index corresponding to an output from the last bank being the most significant bit; and in a second co-ordinate direction, by a second co-ordinate having a magnitude equal to that represented by a binary number consisting of the source indices of the element inputs traversed by that path, taken in the same order as the stages with the index corresponding to an input to the first bank being the most significant bit and the index corresponding to an input to the last bank being the least significant bit.

There are many possible ways in which the source and destination lines may correspond to the first and second co-ordinate directions of the two dimensional array of neurons depending on the source indices and destination indices which are allocated to the element inputs and outputs. FIG. 13 represents one possible way of allocating each element input with source indices and each element output with destination indices for a three stage Banyan network. The source and destination lines are labelled with the letters A to H and I to J respectively to avoid confusion between the source and destination lines and binary numbers which are used to address them. The correspondence, determined using the allocation shown in FIG. 13, between destination lines and a position in a first co-ordinate direction in a two dimensional array of neurons and the correspondence between the source lines and a position a in a second co-ordinate direction in a two dimensional array of neurons such that the set of blocking rules is shift invariant is as follows:

| Destination line | First co-ordinate | Source line | Second co-ordinate |
|---|---|---|---|
| I | 000 | A | 000 |
| K | 001 | C | 001 |
| M | 010 | E | 010 |
| O | 011 | G | 011 |
| J | 100 | B | 100 |
| L | 101 | D | 101 |
| N | 110 | F | 110 |
| P | 111 | H | 111 |

FIG. 14 represents another possible way of allocating each element input with source indices and each element output with destination indices for a three stage Banyan network. This generates the following correspondence giving shift-invariant blocking rules. In this correspondence the destination line corresponding to second co-ordinate 010 (or 2) has been exchanged with the destination line corresponding to second co-ordinate 110 (or 6) in relation to that shown in FIG. 13.

| Destination line | First co-ordinate | Source line | Second co-ordinate |
|---|---|---|---|
| I | 000 | A | 000 |
| K | 001 | C | 001 |
| N | 010 | E | 010 |
| O | 011 | G | 011 |
| J | 100 | B | 100 |
| L | 101 | D | 101 |
| M | 110 | F | 110 |
| P | 111 | H | 111 |

FIG. 15 represents a third possible way of allocating each element input with source indices and each element output with destination indices for a three stage Banyan network. Applying the above rules generates the following correspondence. In this correspondence the source line corresponding to first co-ordinate 001 (or 1) has been exchanged with the source line corresponding to first co-ordinate 011 (or 3) and the source line corresponding to first co-ordinate 101 (or 5) has been exchanged with the source line corresponding to first co-ordinate 111 (or 7) in relation to that shown in FIG. 13.

| Destination line | First co-ordinate | Source line | Second co-ordinate |
|---|---|---|---|
| I | 000 | A | 000 |
| K | 001 | G | 001 |
| M | 010 | E | 010 |
| O | 011 | C | 011 |
| J | 100 | B | 100 |
| L | 101 | H | 101 |
| N | 110 | F | 110 |
| P | 111 | D | 111 |

There are numerous other possibilities. Any cyclic shift (addition Mod $2^n$ of any integer) can be made to the array positions of any given correspondence whilst maintaining shift-invariance of the set of blocking rules.

What is claimed is:

1. A telecommunications switch comprising a switching device having a plurality of stages and control means for recognizing routing requests which involve blocking of the switching device in which a packet is routed from a source line, identified by a binary source address, to a destination line, identified by a binary destination address; each stage of the switching device has a stage index, the last stage has its outputs connected to destination lines of the switch and has a stage index of zero, preceding stages have their outputs connected to inputs of the subsequent stage, and have a stage index equal to the stage index of the subsequent stage incremented by unity;

an output used by a packet after each stage is dependent on a predetermined source set of bits taken from the binary source address and a predetermined destination set of bits taken from the binary destination address;

the number of bits in the source set is equal to the stage index; and the number of bits in the destination set is equal to the stage index subtracted from the total number of stages;

and including an optical neural network having a light source array to illuminate a photodetector array through a mask, each array having a respective array element for each possible path through the switching device, wherein the assignment of paths to array locations is such that, for the path corresponding to any light source array element, the photodetector array element positions corresponding to the paths blocked thereby form a pattern which is a shifted version of the pattern formed by the photodetector array elements corresponding to the paths blocked by a path corresponding to any other light source array element, whereby a single mask may be employed.

2. A telecommunications switch according to claim 1 further comprising a plurality of buffers each with an input for receiving packets to be transmitted and an output line providing a source of packets to be switched.

3. A telecommunications switch according to claim 2 in which the control means is connected to receive destination addresses from packets stored in the buffer, to select packets which can be transmitted through the switching device without mutual blocking, and to release the selected packets from the buffers.

4. A telecommunications switch according to claim 1 in which each of said stages has a plurality of switching elements, and each switching element has two inputs and two outputs and is operable in response to the binary destination address contained in a packet received by the element to route the packet to one or other output, the connection between the stages being such that each element of the first state can serve a subset of the destination lines served by the stage which precedes it, each element in the last stage can serve any source line and each element of any preceding stage can serve a subset of the source lines served by the stage which follows it.

5. A telecommunications switch according to claim 4 in which (i) the output of each element of the first stage has a destination index having a value of 0 or 1 according to whether it serves a first or a second partition of the destination lines;

(ii) the output of each element of each stage after the first has a destination index having a value of 0 or 1 according to whether it serves a first or a second partition of the destination lines served by those elements of the preceding stage to which the element in question is connected;

(iii) the input of each element of the last stage has a source index having a value of 0 or 1 according to whether it serves a first or a second partition of the source lines;

(iv) the input of each element of each preceding stage has a source index having a value of 0 or 1 according to whether it serves a first or a second partition of the source lines served by those elements of the following stage to which the element in question is connected;

(v) for each of said possible paths, the position in the respective array of the light source and of the photodetector which corresponds to that path is determined:

in a first co-ordinate direction, by a first co-ordinate having a magnitude equal to that represented by a binary number consisting of the destination indices of the element outputs traversed by that path, taken in the same order as the stages, with the index corresponding to an output from the first bank being the least significant bit and the index corresponding to an output from the last bank being the most significant bit; and in a second co-ordinate direction, by a second co-ordinate having a magnitude equal to that represented by a binary number consisting of the source indices of the element inputs traversed by that path, taken in the same order as the stages with the index corresponding to an input to the first bank being the most significant bit and the index corresponding to an input to the last bank being the least significant bit.

6. A telecommunications switch comprising:

(a) a plurality of buffers each with an input for receiving packets to be transmitted and an output line providing a source of packets to be switched;

(b) a switching device having a plurality of stages each with a plurality of switching elements, wherein each switching element has two inputs and two outputs and is operable in response to a destination address contained in a packet received by the element to route the packet to one or other output, wherein the first stage has its inputs connected to the source lines, subsequent stages have their inputs connected to outputs of the elements of the preceding stage and the last stage has outputs connected to destination lines of the switch, the links being such that each element of the first stage can serve any destination lines served by the stage which precedes it, each element in the last stage can serve any source line and each element of any preceding stage can serve a subset of the source lines served by the stage which follows it;

(c) control means connected to receive destination addressed from packets store in the buffer, to select packets which can be transmitted through the switching device without mutual blocking, and to release the selected packets from the buffers, the control means including an optical neural network having a two-dimensional array of light sources disposed to illuminate via a mask a two-dimensional array of photodetectors, and feedback means from the detectors to the sources, wherein each light source corresponds to a respective one of possible paths through the switching device and each photodetector corresponds to a respective one of said possible paths; wherein:

(i) the output of each element of the first stage has a destination index having a value of 0 or 1 according to whether it serves a first or a second partition of the destination lines;

(ii) the output of each element of each stage after the first has a destination index having a value of 0 or 1 according to whether it serves a first or a second partition of the destination lines served by those elements of the preceding stage to which the element in question is connected;

(iii) the input of each element of the last stage has a source index having a value of 0 or 1 according to whether it serves a first or a second partition of the source lines;

(iv) the input of each element of each preceding stage has a source index having a value of 0 or 1 according to whether it serves a first or a second partition of the source lines served by those elements of the following stage to which the element in question is connected;

(v) for each of said possible paths, the position in the respective array of the light source and of the photodetector which corresponds to that path is determined:

in a first co-ordinate direction, by a first co-ordinate having a magnitude equal to that represented by a binary number consisting of the destination indices of the element outputs traversed by that path, taken in the same order as the stages, with the index corresponding to an output from the first bank being the least significant bit and the index corresponding to an output from the last bank being the most significant bit; and in a second co-ordinate direction, by a second co-ordinate having a magnitude equal to that represented by a binary number consisting of the source indices of the element inputs traversed by that path, taken in the same order as the stages with the index corresponding to an input to the first bank being the most significant bit and the index corresponding to an input to the last bank being the least significant bit.

* * * * *